United States Patent [19]

Roy

[11] 4,108,770

[45] Aug. 22, 1978

[54] CHROMIUM REDUCTION PROCESS

[76] Inventor: Clarence H. Roy, Oak Ridge Dr., Bethany, Conn. 06510

[21] Appl. No.: 733,354

[22] Filed: Oct. 18, 1976

Related U.S. Application Data

[63] Continuation of Ser. No. 606,024, Aug. 20, 1975, abandoned, which is a continuation of Ser. No. 430,735, Jan. 4, 1975, abandoned, which is a continuation of Ser. No. 270,711, Jul. 11, 1972, abandoned, which is a continuation-in-part of Ser. No. 83,120, Dec. 10, 1970, abandoned.

[51] Int. Cl.² .................................... C02C 5/02
[52] U.S. Cl. ........................................... 210/50
[58] Field of Search ............................ 210/50, 63 R

[56] References Cited

U.S. PATENT DOCUMENTS 3,575,853  4/1971  Gaughan et al. .................. 210/50

OTHER PUBLICATIONS

Hoover et al., "Disposal of Waste Liquors from Chromium Plating Processes," *Ind. Eng. Chem.*, vol. 33, No. 1, Jan. 1941, pp. 131–134.

*Primary Examiner*—T. G. Wyse
*Attorney, Agent, or Firm*—DeLio and Montgomery

[57] ABSTRACT

The toxicity of industrial process waters due to the presence of hexavalent chromium compounds is efficiently eliminated through reduction of the hexavalent chromium to 1 ppm. or less by adjusting the pH of the waters to 1.0–2.6, and passing the acidified waters through a bed of non-powdery elemental iron particles, while maintaining in the reaction mixture stoichiometric amounts of sulfuric acid relative to the hexavalent chromium. The hexavalent chromium is thereby reduced to the relatively non-toxic trivalent state. The process is conducted either by multiple passes through one reactor or by passing the acidified waters through two reactors connected in series, containing beds of elemental iron particles.

8 Claims, 2 Drawing Figures

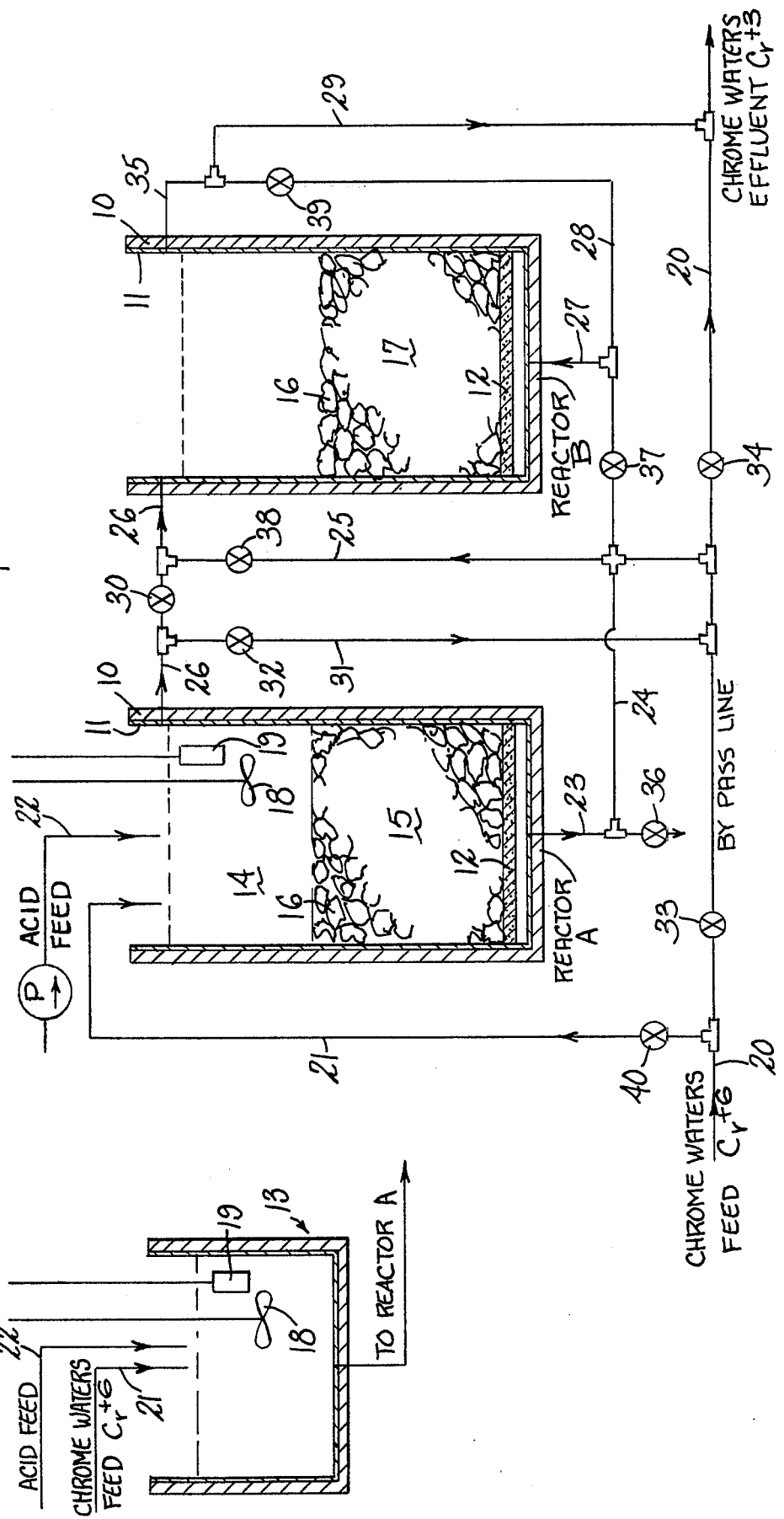

CHROMIUM REDUCTION PROCESS

This is a continuation of application Ser. No. 606,024, filed Aug. 20, 1975, now abandoned; Ser. No. 606,024 is a continuation of Ser. No. 430,735, filed Jan. 4, 1975, now abandoned; Ser. No. 430,735 is a continuation of Ser. No. 270,711, filed July 11, 1972, now abandoned; Ser. No. 270,711, is a continuation-in-part of Ser. No. 83,120, filed Dec. 10, 1970, now abandoned.

BACKGROUND OF THE INVENTION

This invention relates to the purification of waters containing hexavalent chromium compounds. In particular, the invention relates to a process for chemically reducing or eliminating toxic hexavalent chromium compounds from industrial process effluent or rinse waters such as waters resulting from chromate oxidation or chrome electroplating processes.

A significant pollutant found in industrial waste waters is the highly toxic hexavalent chromium, most often in the form of chromates, bichromates or chromic acid used in oxidation processes, as in chrome dyeing and tanning. An additonal source of hexavalent chromium compounds is the effluent from chrome electroplating and in the anodizing of aluminum, such as rinse waters used in or resulting from such processes. Regulatory agencies in many states now require that industrial effluents contain 1 ppm. or less of hexavalent chromium.

While it is known that these highly toxic substances are removed by reduction with sulfur dioxide or hydrazine to form relatively non-toxic trivalent chromium compounds, the former in connection with sulphite-bisulphite systems, such processes are cumbersome, inefficient, difficult to control, and present health hazards due to the presence of the sulphur dioxide or hydrazine.

Processes are also known in which chromium compounds are recovered from spent caustic chromium ore baths by reduction with elemental iron. Such techniques have remained slow and inefficient, even when reduction to the trivalent state was not required.

OBJECTS AND SUMMARY

Accordingly, an object of the present invention is to provide a new and improved process for combatting water pollution, due to the presence of highly toxic hexavalent chromium compounds in industrial process waters and effluents, by reducing this pollutant to relatively non-toxic levels, of the order of 1 ppm. or less.

Another object is to provide a new and improved process for the reduction of hexavalent chromium compounds, such as are present in waters from oxidation processes and chrome plating, to trivalent chromium compounds.

A further object is to provide a new and improved process for reducing the toxicity of the rinse waters from chrome electroplating processes.

These and other objects, features and advantages of the invention will be apparent from the specification.

In summary, it has been discovered that the highly toxic hexavalent chromium compounds ("hexachrome") commonly found in industrial process waters may be efficiently and economically reduced in a gravity flow system, even to levels below 1 ppm., by adjusting the pH of the waters to a highly acidic level and maintaining stoichiometric concentrations of sulfuric acid therein, and reactively contacting the acidified waters with non-powdery elemental iron particles. The process provides virtually total reduction of the toxic hexavalent chromium to relatively non-toxic trivalent chromium in a comparatively short time and can be made continuous or semi-continuous.

DETAILED DESCRIPTION

For a fuller understanding of the nature and objects of the invention, reference is had to the following description taken in connection with the accompanying drawing in which:

FIG. 1 is a schematic flow diagram illustrating preferred embodiments of the invention; and FIG. 2 is a schematic diagram of alternate provision for a portion of the embodiment of FIG. 1.

with reference to FIGS. 1 and 2, three modes of practice of the invention are illustrated. Common to the three modes are a plurality of reactors, preferably at least two reaction vessels such as reactors A and B. The reactors as shown are open to the atmosphere but closed reactors also will be suitable with appropriate adjustment of pressure and temperature. Each reactor typically is constructed of a fiberglass outer wall 10 lined with a stainless steel interior wall 11, and is fitted with screens 12 slightly above the bottom. The screens serve to hold a bed of elemental iron material, in the form of non-powdery iron or steel particles or fragments 16, a short distance from the bottom of each reactor to facilitate passage of process feed waters through the bed and into the connecting lines.

Heretofore, it has been believed that the dissolving of large quantities of elemental iron by a strong acid such as sulfuric acid has been necessary for successful reduction of hexavalent chromium, perhaps on the assumption that the most important rate controlling factor was the formation of $FeSO_4$, this in turn depending upon the extent to which the hexachrome could contact the elemental iron. Thus, the known processes stress high surface area of the iron and therefore teach the use of finely divided iron, such as iron powder. This approach in a gravity system, however, causes packing or "blinding" of the reactor by rusting of the iron powder and by formation of sulfate sludge, and requires pumps and flow patterns to prevent the packing. Gravity flow in such systems seems to be impractical.

Perhaps in an effort to improve such processes, it is known to combine the reduction process with caustic treatment to precipitate the trivalent chromium as hydroxide, with recirculation of some of the precipitate to the reduced stream to improve the precipitation by seeding. See U.S. Pat. No. 3,575,853.

In contrast, it has been found that essentially complete reduction of the hexachrome can be achieved, without resort to complex flow designs and pumps, by using a bed of particulate iron or steel, where the particle size is sufficiently large so that the hexachrome and sulfuric acid reaction mixture can flow by gravity through the bed. A surprising benefit of the process is that very little $FeSO_4$ sludge is formed, and reaction rate is controlled essentially by monitoring the pH of the reaction mixture (once the pH has been correlated with the required sulfuric acid content). Moreover, rusting of the iron does not seriously impede the flows.

The iron or steel particle size effective for these results can vary widely, but generally non-powdery iron or steel fragments of dimensions of at least about one-fourth inch in length and width and at least about one-eighth inch in thickness are effective. Such particles or fragments are commonly discarded as scrap from various manufacturing facilities, such as in the manufacture of fingernail clippers, belt buckles, and the like. The particle size should not be too large since the surface area would thereby be reduced too greatly. Particle sizes up to about the volume occupied by a fragment of one inch length and width and a quarter inch thickness have been found effective. Fragments of less than about one-eighth inch thickness should be avoided since such thin stock (if flat) will tend to layer and thereby pack. Generally, the more irregular the shape of the particles the better will be the contact and flow.

For convenience of discussion the term "elemental iron" as used herein includes pure iron, iron alloys, or steel of varying iron content.

In the first mode of practice, reactor A is divided into two zones 14 and 15. The lower zone 15 comprises the bed of elemental iron particles. The upper zone 14 facilitates mixing of the acid feed with the process waters, and adjustment and control of the activity thereof. Means for intimately mixing the acid feed with the process waters, such as a propeller mixer 18 and an acidity measuring device, such as pH probe 19, may be provided in zone 14. Reactor B in all three modes of practice comprises a single reaction zone 17 containing a bed of elemental iron or steel particles 16, similar to reaction A.

In operation of the first mode of the invention, hexavalent chromium containing waters, such as the rinse waters from a chromium electroplating operation or effluent from chromate oxidation processes, are passed via lines 20 and 21 into zone 14 of reactor A for "pre-mixing" therein with acid pumped or gravity fed into the zone via line 22. Agitation of the pre-mix in zone 14 is provided by propeller 18 and flow rates of the chrome feed waters and acid may be controlled by gravity in accordance with the pH of the mixture as sensed by pH probe 19. The pH probe 19 may monitor the pump or valve for the acid feed by utilization of known circuitry (not shown). It is important to maintain the acidity in zone 14 at pH 1.0–2.6, preferably 1.5–2.1, for reasons discussed below. The flow rates are also related to the rates of reduction in reactors A and B, and other conditions such as temperature, pressure, concentration of hexavalent chromium in the chrome waters feed, and the like, and may be varied accordingly.

It has been found that the reduction of hexavalent chromium to trivalent chromium in the presence of the elemental iron particles is related not only to the pH of the reaction mixture but also is critically related to the proportion by weight of sulfuric acid to the hexavalent chromium, assuming an excess of the iron or steel fragments. Thus, although hydrochloric acid could be used for the adjustment of the pH to the required acid range, hydrochloric acid tends to fume and attacks iron so energetically as to raise reaction control problems. Although the known hexachrome reduction processes indicate that high acidity assists the reduction, the prior art is silent as to how the acidity is related to other variables of the process, particularly as to the chemistry of the process and the physical characteristics of the elemental iron, so that, given the proper form of the elemental iron in the reactor bed, the process can be controlled essentially by monitoring the pH and sulfuric acid addition. Whereas the known processes require multiple reactors and auxiliary equipment or systems such as pumps and alkaline treatment, requiring considerable space and complex controls, applicant by careful analysis of the chemistry and physical aspects of the process, has determined how to reduce hexachrome efficiently, economically, on any scale, and even though the hexachrome content of the waters being treated varies widely during treatment. The invention is based on the recognition that the reaction is essentially stoichiometric relative to the hexachrome and sulfuric acid, given the condition of excess particulate iron or steel in the reactor bed.

The reduction, based on experiments to date with feed waters containing from 50 to 800 ppm. hexachrome and the chemistry believed applicable, appears to require at least about 5 lbs. of sulfuric acid (100% basis) for each lb. of hexavalent chromium. In practice, however, a stoichiometric excess of sulfuric acid is usually present, since it has been found that there is generally more sulfuric acid present in the reaction mixture than is apparent from the calculated pH. Nevertheless, even though the pH as calculated would provide more acid than is actually needed (if the acid quantity were monitored by maintaining the measured pH at the calculated pH), the proportionality between the acid and the hexachrome holds true (the difference between calculated and actual requirements being essentially a constant). Accordingly, for any application of the process, maintaining the pH of the reaction mixture in the indicated limits, corresponding to proportions by weight of sulfuric acid to hexachrome of 5:1 to 8:1, will be effective.

After acidification, the waters flow by gravity through the bed of elemental iron particles in zone 15 where reduction of the hexavalent chromium to trivalent chromium is initiated. Residence time in zone 15 will depend upon a number of factors. For a chrome waters feed containing about 200 ppm. of hexavalent chromium, about 2–10 minutes is sufficient to provide the more than 50% reduction of available hexavalent chromium achievable in reactor A.

The partially reduced chrome waters then pass by gravity through lines 23, 24 and 27 preferably into the bottom of reactor B for contact with the bed of iron or steel scrap in zone 17. Reduction of hexavalent chromium in the waters entering reactor B to trivalent chromium is substantially complete in zone 17, the purified waters then being transported via lines 35 and 29 for further processing if desired. Periodically, the flow through the reactors may be reversed, for example by backwashing with clean water, in order to aid in loosening or removing any sludge formed during the reduction. It should be understood that the sludge formed, if any, is not due to the reduction of hexavalent chromium to trivalent chromium, since the latter is highly water soluble, but rather to impurities in the iron fragments, such as the carbon found in steel. Periodically (but rarely), elemental iron particles are added to the reactors to replenish that which may be used up in the reduction.

In the process as just described, it will be obvious that several valves must be in closed position. These are valves 33, 34, 36, 38 and 39. Provision is made for overflow from reactor A into reactor B by line 26, valve 30 being in an open position and valve 32 being closed. Alternatively, if valve 30 is closed and valves 32 and 34 are open, the overflow then will pass via line 20 into the effluent stream. Valve 36 may be opened to flush reactor A or for inspection of the reactor bed.

An alternate flow pattern in the first mode of practice is to pass the effluent from reactor A into the top of reactor B via lines 23, 25 and 26 by appropriate control of the valves. This flow path may be employed intermittently with the first flow path in order to avoid channeling or uneven attrition in the scrap iron bed of reactor B.

In a variation on the first mode of practice, the excess of ferrous iron which may be present in the treated waters of the effluent stream, especially when an excess of acid has been added, can be used to reduce hexavalent chromium added to these waters from a different source, or originating from the same source via bypass line 20.

Residence time in reactor B may be about the same as in reactor A but this will depend upon a variety of factors, including the rate of feed of the chrome waters, concentration of hexavalent chromium in the feed, the geometry of the reactors, and the like. For a chrome waters feed containing about 200 ppm. of hexavalent chromium, it has been found that about 5–15 minutes total residence time in the reactors is sufficient. Residence times in the individual reactors may be varied, of course, by providing a pump in the connecting lines, or by different volume reactors assuming constant inlet fluid pressure. However, the system operates very efficiently under gravity flow conditions, and pumps normally are not required.

In the second mode of practice of the invention, valves 32, 33 and 37 are maintained in an open position, and valves 34, 36, 38, 39 and 40 are closed. Overflow may be controlled as already described. By this means some of the chrome waters feed bypasses reactor A and enters reactor B only, where it is acidified by a stream from reactor A also entering the bottom of reactor B via lines 23, 24 and 27. The latter stream is made more highly acidic than it is in the first mode of practice and contains a high concentration of ferrous ion. These ingredients, together with the hydrogen evolved in reactor B and other reaction products, reduces the hexavalent chromium to trivalent chromium in reactor B in essentially a single step or pass.

This second procedure may provide a treatment rate somewhat higher than that of the first mode and therefore is more suited to higher flows of hexavalent chrome feed waters. However, this second mode has the disadvantage that it is more difficult to control. Consequently, it would be preferred over the first mode only when batch treatment of the hexavalent chromium containing waters is desired rather than a semi-continuous or continuous treatment.

As in the first mode and as evident in the drawing, the second mode of practice preferably includes provision for periodic flow reversal in order to remove sludge and to maintain free-flow conditions.

In the third mode of practice, a separate vessel 13, similar in construction to reactors A and B, is provided for pre-mixing the acid and chrome feed waters. This separate vessel 13 may be a receiving tank for the rinsings from a chrome electroplating plant or for effluent from oxidation processes involving chromates or chromic acid, into which sulfuric acid is pumped from carboys or other containers. In effect, the separate pre-mix vessel 13 is a substitute for pre-mix zone 14 of reactor A, including auxiliary apparatus such as a propeller mixer 18 and pH meter 19. As with the first and second modes of practice, flow from the pre-mixing vessel to the scrap iron reduction beds in reactors A and B may be monitored by the pH meter in conjunction with suitable circuitry.

With the exception of the separate acid pre-mixing vessel, other aspects of the third mode of practice are substantially the same as in the first and second modes. The provision of a separate pre-mixing vessel in accordance with the third mode has several advantages. Among these are minimization of sludge formation, greater flexibility in flow patterns, increased elemental iron capacity in the first reactor and therefore increased reduction potential, and reactor design conveniences such as the mounting of auxiliary apparatus (mixer, pH meter, control circuitry) for greater accessibility. However, the third mode of practice requires more equipment space and therefore will not be utilized when space conservation is a primary concern.

When the waters to be treated are pre-mixed with acid in accordance with the third mode, the reactors can be operated with the following flow patterns:

(1) Up reactor A — Up reactor B in series;
(2) Up reactor A — Up reactor B in parallel;
(3) Down reactor A — down reactor B in series;
(4) Down reactor A — down reactor B in parallel;
(5) Down reactor A — Up reactor B in series (as in the first mode);
(6) Up reactor A — Down reactor B in series.

Some variations in the valving and piping from that shown in FIG. 1 would be required to achieve some of these flow patterns. The parallel types of operation would be useful where short residence times and high flow rates were required.

While it would be possible to conduct the process of the invention with a single reactor having a zone for premixing the acid and chrome waters feed or having a separate vessel for such pre-mixing, in practice it has been found that such one-reactor systems usually require multiple passes of the chrome waters for complete reduction of the hexavalent chromium to trivalent chromium, thereby reducing the effective treatment rate complicating control. However, when dealing with streams having low or constant hexavalent chromium content a single pass of the acidified waters through one reactor may provide the desired degree of reduction. In contrast, the two-reactor process of the invention reduces residence time of the chrome waters in the reactor or reactors, provides a more reliable system, minimizes channeling in the iron beds of the reactors by providing increased reactive contact area ("randomizing") in the reactors, permits the use of lower reactor silhouette, and provides greater flexibility in choice of flow paths, flow rates, back-washing, overflow control, whether the process is to be run continuously semicontinuously, or batchwise, and the like. A specific benefit of the two reactor system over the one reactor system is that it makes the process less susceptible to upset by fluctuations in hexavalent chromium concentration in the feed waters, a rather common occurrence in some industrial effluents.

It is believed that the reduction reactions involved in the process may be described by the following equations:

$$Fe + CrO_4^{-2} + 8H^+ \rightarrow Fe^{+3} + Cr^{+3} + 4H_2O \qquad 1.$$

$$3Fe + 2CrO_4^{-2} + 16H^+ \rightarrow 3Fe^{+2} + 2Cr^{+3} + 8H_2O \qquad 2.$$

$$3Fe^{+2} + CrO_4^{-2} + 8H^+ \rightarrow 3Fe^{+3} + Cr^{+3} + 4H_2O \qquad 3.$$

$$Fe + 2H^+ \rightarrow Fe^{+2} + H_2 \qquad 4.$$

$$3H_2 + 2CrO_4^{-2} + 10H^+ \rightarrow 2 Cr^{+3} + 8H_2O \qquad 5.$$

As will be evident from the equations, the amount of acid required is proportionate to the hexavalent chromium content of the chrome waters being treated. The acid content can be closely correlated with pH measurements, therefore providing conveniently for adjustment when hexavalent chromium concentrations fluctuate, as is often the case in waters from chromium electroplating or chromate oxidation processes. It is believed that the pH control maintains the sulphate ions in the reaction mixtures at levels sufficient to shift the equilibrium to favor complete reduction of hexavalent chromium to trivalent chromium. While two passes of the same hexavalent chromium containing waters through reactor B alone will surffice to substantially reduce all of the 200 ppm. hexavalent chromium in a hexavalent chromium waters feed, it is preferred to run the process continuously through both reactors if the chrome waters to be treated can be fed continuously. The preferred pH when both reactors are used to reduce the chrome waters, as in the first and third modes described above, is 1.5–2.0 in reactor A (or separate pre-mixing vessel) and 1.8–2.2 in reactor B. When the second mode of operation is employed, the pH of the sulfuric acid stream entering reactor B will be 1.0–2.6, preferably 1.5–2.1.

If desired, the waters resulting from the process of the invention may be led to a conventional neutralization facility, where the addition of alkaline material, such as caustic, lime or the like, will cause precipitation of both the trivalent chromium and iron content of the waters. Removal of the resulting suspended oxides or hydroxides may then be accomplished by known means. However, if acceptable, the suspension may be led to sewage.

The process of the invention operates effectively at ther temperatures encountered in hexavalent chromium containing industrial process waters but higher or lower temperatures may be employed if desired. Heat of reaction often causes elevation of the temperature, but this poses no problem.

While the invention has been specifically described in terms of one or two reactors containing beds of elemental iron, it will be evident that a plurality of such reactors greater than two may be employed, either in tandem, as illustrated, or as a plurality of zones of reduction within a single reaction vessel or tower. As indicated above, primary features of the invention are the control of the acidity prior to and during contact with the bed of elemental iron, and the particulate nature of the iron or steel. Considerations of reactor configuration, valving, fluid pressure, and the number of reactors or zones of reduction therefore are secondary. Accordingly, the invention includes such modifications.

While it might be expected that a two phase reaction such as described above might be too slow to be of commercial use in a continuous stream treatment, it has been found that when the pH range specified is provided in a pre-mixing zone, that is, before contacting the bulk of iron or steel bed, the reaction is relatively rapid and lends itself to applications described.

Because the iron or steel consumed in the process is not excessive, the amount of sludge produced by the added iron content in the effluent from this process does not represent a significant burden to subsequent neutralization or settling operations. In fact, in certain instances, as when the treated waters are passed into municipal sewers, the presence of the dissolved iron may aid settling by acting as a flocculating aid, as is known in the art.

While reduction of hexavalent chromium to less than 1 ppm. is easily achieved by the process of the invention, in some instances it may be preferred to introduce the treatment at some point in an industrial process where reduction to 1 ppm. or less is not required or is undesirable. The process of the invention can be varied to provide such levels of control, primarily by acid concentrations and pH, and by residence times in the elemental iron beds of the reactors.

The following examples are intended as further illustration of the invention but are not necessarily limitative except as set forth in the claims. All parts and percentages are by weight unless otherwise indicated.

EXAMPLE 1

Two 100 gallon cylindrical fiberglass reactors, 24 inches in diameter and 48 inches high, were fitted with stainless steel liners having a screen bottom such that the screen was about 2 inches from the bottom of the reactors. The first reactor was fitted with a mechanical mixer and a pH meter. Each reactor was about half-filled with steel fragments from the stamping of finger nail clippers from steel blanks, the size of the fragments being about the size of the tip of one's thumb, and shaped like a capital letter H. Auxiliary to the reactors were a standard acid carboy containing concentrated sulfuric acid and connected to the first reactor by an acid feed pump, a receiving tank for hexavalent chromium containing rinse waters from a commercial chromium electroplating operation, and instrumentation for monitoring the acid pump in accordance with the pH meter readings. The concentration of hexavalent chromium in the rinse waters was about 200 ppm. The flow rate by gravity of chrome rinse water feed was set at 10 gallons per minute into the first reactor and the acid feed was also set so as to provide a pH of about 1.8 in the upper portion (pre-mixing zone) of the reactor. The two reactors were connected by lines and valving for gravity flow substantially as indicated in the accompanying drawing and it was observed that a total residence time in the two reactors of about 10 minutes was effective in substantially totally reducing all of the hexavalent chromium to the trivalent state, as determined by subsequent analysis. The pH in the second reactor was observed to be about 2.0 but did not require adjustment separately from adjustment of the pH in the first reactor. The process, even after running for over 1,000 hours in the treatment of industrial chrome rinse waters, required virtually no attention after being set in operation each day, and emitted no offensive odor. Moreover, little or no sludge was produced and even that which resulted, was conveniently removed by flow reversal. The efficiency of the process was found to be close to theoretical, requiring about a pound of scrap steel and about six pounds of sulfuric acid to reduce a pound of hexavalent chromium compounds to the trivalent state. Accordingly, the process was highly economical.

EXAMPLE 2

In a reactor setup substantially as described in Example 1, the valves were adjusted for gravity flow such that the chrome waters feed bypassed the first reactor and entered the second reactor. All other conditions were maintained as in Example 1, including an acid feed into reactor A providing a pH of about 1.3. The gravity flow rate of chrome rinse waters which could be accommodated by regulation of the process in this manner, in order to achieve substantially total reduction of the hexavalent chromium to trivalent chromium, was about 15 gallons per minute.

EXAMPLE 3

A reactor setup substantially as described in Example 1 was provided except that the mechanical mixer, pH meter and acid flow monitoring instrumentation were mounted above the chrome waters receiving tank, and the pre-mix zone in the first reactor was eliminated by increasing the steel scrap bed size. When operated substantially as described in examples 1 or 2, substantially total reduction of hexavalent chromium to trivalent chromium was achieved.

EXAMPLE 4

This example illustrates the process of the invention using a single reactor.

A single glass distilling column (1 × 24 inches) was packed with small pieces of scrap steel of the character described in Example 1. A sample of chromium plating rinse waters containing 220 ppm. hexavalent chromium was acidified with sulfuric acid to pH 2.0 and passed through the column by gravity. The $Cr^{+6}$ content was substantially reduced by this treatment. The pH of the treated water was again adjusted to 2.0 and the waters passed by gravity through the column again. The $Cr^{+6}$ content of this treated water was virtually zero as determined by the color reaction with diphenyl carbazide reagent solution. By lowering the pH to 1.0 nearly complete reduction to trivalent chromium was achieved on a single pass through the column. Residence time of the rinse waters on the column was found to be related to pH since the more highly acidic solutions gave the fastest results. However, since the more acid pH values increase the expense of the process, it was concluded that multiple passes through a single column or single passes through multiple columns, starting with pH values nearer to 2.0 would be more economical and yet give relatively rapid reduction of hexavalent chromium.

It will thus be seen that the objects set forth above, among those made apparent from the preceding description, are efficiently attained and, since certain changes may be made in carrying out the above process without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A continuous process effective by gravity flow for the substantially complete reduction of hexavalent chromium compounds in industrial process waters containing the same to trivalent chromium compounds with minimal sludge formation, comprising the steps of:
    (a) adjusting and maintaining the pH of said waters to 1.0 to 2.1 by addition of sulfuric acid to acidify said waters, and
    (b) reactably contacting said waters by continuous gravitational flow through a bed of non-powdery elemental iron particles, said particles having a volume equivalent to particles of at least ¼ inch in length and width and about ⅛ inch in thickness, whereby at least stoichiometric proportions of sulfuric acid and said hexavalent chromium compounds are maintained in said waters while said waters are in contact with said bed.

2. The process of claim 1 wherein the proportion by weight of sulfuric acid to hexavalent chromium compounds is 1:5 to 8:1.

3. The process of claim 1 wherein step (b) is conducted by passing said acidified waters first downwardly through a first zone defined by a separate bed of said elemental iron particles and thereafter upwardly through a second zone defined by a separate bed of said elemental iron particles.

4. The process of claim 3 wherein two beds of said elemental iron particles, one in each of two separate reaction vessels, are provided.

5. The process of claim 4 wherein the first of said reaction vessels has an upper zone for said pH adjustment.

6. The process of claim 4 wherein said pH adjustment is effected in a third vessel and said acidified waters are then passed therefrom continuously through said beds of elemental iron particles.

7. The process of claim 5 wherein the pH in said first reaction vessel is maintained at 1.5 to 2.0 and the pH in said second reaction vessel is maintained at 1.8 to 2.2.

8. The process of claim 1 wherein said elemental iron particles individually comprise scrap steel.

* * * * *